(12) United States Patent
Rangarajan et al.

(10) Patent No.: US 7,508,829 B2
(45) Date of Patent: Mar. 24, 2009

(54) METHOD AND APPARATUS PROVIDING PRIORITIZED RECURSION RESOLUTION OF BORDER GATEWAY PROTOCOL FORWARDING INFORMATION BASES

(75) Inventors: Vijay Rangarajan, Fremont, CA (US); Clarence Filsfils, Brussels (BE); John Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 605 days.

(21) Appl. No.: 11/291,940

(22) Filed: Nov. 30, 2005

(65) Prior Publication Data

US 2007/0121524 A1    May 31, 2007

(51) Int. Cl.
*H04L 12/28* (2006.01)
(52) U.S. Cl. .................................. 370/392; 370/412
(58) Field of Classification Search ................. 370/392, 370/412
See application file for complete search history.

(56) References Cited

U.S. PATENT DOCUMENTS

| | | | |
|---|---|---|---|
| 6,148,000 A | | 11/2000 | Feldman et al. |
| 6,816,494 B1 * | | 11/2004 | Raza ..................... 370/395.41 |
| 6,985,493 B1 * | | 1/2006 | Roumas ...................... 370/465 |
| 2002/0038339 A1 | | 3/2002 | Xu |
| 2002/0080755 A1 | | 6/2002 | Tasman et al. |
| 2003/0161311 A1 * | | 8/2003 | Hiironniemi ................. 370/392 |
| 2004/0081177 A1 * | | 4/2004 | Henderickx et al. .......... 370/401 |
| 2004/0131040 A1 * | | 7/2004 | Gruhl et al. .................. 370/349 |
| 2004/0228274 A1 * | | 11/2004 | Yazaki et al. ................ 370/229 |
| 2006/0291446 A1 * | | 12/2006 | Caldwell et al. ............. 370/351 |
| 2007/0014276 A1 * | | 1/2007 | Bettink et al. ................ 370/351 |
| 2007/0115848 A1 * | | 5/2007 | Chean et al. ................. 370/252 |

OTHER PUBLICATIONS

PCT International Search Report and Written Opinion in international application PCT/US06/45143, mailed Sep. 25, 2007, published by International Bureau of WIPO, Geneva, Switzerland, 9 pages.
Y. Rekhter et al., "A Border Gateway Protocol 4 (BGP-4)" (RFC 1771), Internet Engineering Task Force, Mar. 1995, pp. 1-54.
T. Bates et al., "Multiprotocol Extensions for BGP-4" (RFC 2858), Internet Engineering Task Force, Jun. 2000, pp. 1-11.
Anonymous, "Nonstop Forwarding Enhanced FIB Refresh," Cisco Systems, Inc., 2002, pp. 1-16.
T. Sridhar et al., "Services API Facilitates Dataplane, Control Plane Separation," CommsDesign, Aug. 21, 2003, pp. 1-7.
T. Klockar et al., "Modularized BGP for Decentralization in a Distributed Router," Winternet, Stockholm Sweden, Aug. 18, 2005, 1 page.

* cited by examiner

*Primary Examiner*—Andrew Lee
(74) *Attorney, Agent, or Firm*—Hickman Palermo Truong & Becker LLP

(57) ABSTRACT

A method, performed in a network packet routing element, comprises establishing a forwarding information base (FIB) lacking a hierarchical data structure but in which one or more dependent FIB entries are associated with a parent FIB entry; establishing a plurality of strict priority queues, each having an associated priority; receiving a change to the parent FIB entry; for each of the dependent FIB entries, selecting one of the queues and enqueuing the dependent FIB entries in the selected queues for re-resolution; dequeuing the dependent FIB entries for re-resolution, according to a priority order of the queues.

27 Claims, 4 Drawing Sheets

USUS 7,508,829 B2

METHOD AND APPARATUS PROVIDING PRIORITIZED RECURSION RESOLUTION OF BORDER GATEWAY PROTOCOL FORWARDING INFORMATION BASES

FIELD OF THE INVENTION

The present invention generally relates to managing network routing information. The invention relates more specifically to improving how Border Gateway Protocol (BGP) peers resolve forwarding information base information.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for exchanging routing information among network elements in the same or different Autonomous System (AS). The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995).

To exchange routing information, two BGP hosts first establish a BGP peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is a unit of information that pairs a network destination with the attributes of a network path to that destination. Examples of path attributes include, but are not limited to, the ORIGIN attribute (which indicates how a BGP peer learned about a route), the AS_PATH attribute (which indicates the Autonomous Systems through which a route passes), the NEXT_HOP attribute (which is the address of the border router that is the next hop in a route), and the LOCAL_PREF attribute (which indicates the BGP peer's degree of preference of an exit point from the local AS for a route). In BGP literature, routes are sometimes termed prefixes.

When a BGP host receives routes, the host determines a best path to each reachable node, for example, by computing a shortest path first (SPF) spanning tree of nodes between the host and the reachable node. In certain cases, other computations and route resolution steps are performed. Fully resolved routes are stored in a forwarding information base (FIB) that is coupled to or hosted in line cards of the BGP host. In this architecture, packet-forwarding logic in the line cards can determine a next hop for a received packed by performing a lookup in the FIB.

For example, in Multiprotocol Label Switching virtual private networks (MPLS VPNs), Multi-Protocol BGP (MP-BGP) provides the framework to exchange reachability information about many protocols such as IPv4, VPNv4, IPv6, multicast, and others. MP-BGP allocates labels for VPN prefixes in an advertising provider edge router (denoted PE1 herein) and accepts them in a receiving provider router (PE2).

An MPLS VPN network logically comprises a control plane (analogous to call setup) and a forwarding plane (analogous to call transmission). As a specific example, assume that a sending customer edge router (CE1) advertises an IP prefix, "5.5.5.5/32," to PE1 via a routing protocol such as BGP, Enhanced Interior Gateway Routing Protocol (EIGRP), Router Information Protocol (RIP), or the like.

After receiving the advertisement, PE1 converts the IP prefix 5.5.5.5/32 into a VPN prefix, "1:1:5.5.5.5/32." Next, PE1 allocates the label (for example, 20) to 1:1:5.5.5.5./32 and installs it in both BGP and the Label Forwarding Information Base (LFIB). PE1 then advertises the prefix to PE2 via MP-BGP. PE routers, which use an Interior Gateway Protocol (IGP) such as Intermediate System-to-Intermediate System (IS-IS) or Open Shortest Path First (OSPF), do not have any VPN knowledge. PE routers might optionally exchange IPv4 routes via MP-BGP.

PE2, after receiving the MP-BGP advertisement, checks whether the VPN prefix is acceptable by comparing the route target (RT) values. If acceptable, PE2 installs the prefix and label in the BGP and VPN Routing and Forwarding (VRF) FIB tables and advertises the prefix to CE2. In the meantime, the FIB performs a recursion resolution process to find a valid route and label to VPN prefix's next-hop (for example, PE1). If the FIB finds a valid route, the FIB installs the next-hop label in the label stack that also contains the VPN label. This label stack is what FIB (at PE2) will use to forward VPN packets toward PE1.

In current practice, some routers do not support a hierarchical FIB structure, but FIB entries may have parent FIB entries that are associated with dependent (child) FIB entries. An example of a parent FIB entry is an IGP entry for a BGP next hop; an example of a dependent FIB entry is a BGP route entry. In this arrangement, each dependent FIB entry contains its own forwarding information. When a change occurs in a parent FIB entry, all the dependent entries are queued for re-performing the recursion resolution process. During re-resolution, affected routes are not routable; as a result, connectivity is lost for some BGP-destined data streams. Some routers are known to have this problem.

One approach for addressing this problem is to create a hierarchical FIB in which dependent FIB entries are linked directly to the forwarding information of the parent entry. This ensures that the dependent entries immediately leverage any update to the forwarding information of the parent. However, not all routers can support such linked FIB entries. There is a need to avoid the loss of connectivity and other disadvantages of current practice without requiring a linked hierarchical structure.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
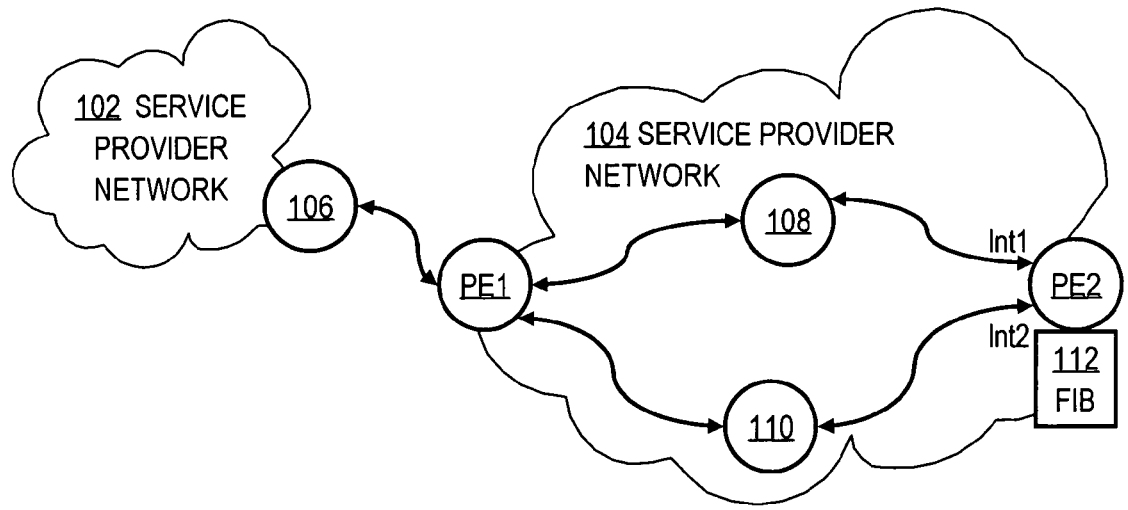
FIG. 1 is a block diagram that illustrates an overview of an example network context in which an embodiment may be implemented.

A method and apparatus providing prioritized FIB recursion resolution in Border Gateway Protocol (BGP) service is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Prioritized FIB Recursion Resolution
4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method, performed in a network packet routing element, the method comprising establishing a forwarding information base (FIB) lacking a hierarchical data structure but wherein one or more dependent FIB entries are associated with a parent FIB entry; establishing a plurality of strict priority queues, wherein each of the queues has an associated priority; receiving a change to the parent FIB entry; for each of the dependent FIB entries, selecting one of the queues and enqueuing the dependent FIB entries in the selected queues for re-resolution; and dequeuing the dependent FIB entries for re-resolution, according to a priority order of the queues.

In one feature, one of the queues for a particular dependent FIB entry is selected based on a priority community value or other information specific to the particular dependent FIB entry. In another feature, one of the queues for a particular dependent FIB entry is selected based on a type of the change to the parent FIB entry. In yet another feature, one of the queues for a particular dependent FIB entry is selected based on a local policy stored in the network element that specifies one of the queues for all FIB entries associated with a particular service.

In still another feature, a higher-priority queue is selected when the change to the parent FIB entry is a deletion and a lower-priority queue is selected when the change is a modification. In yet another feature, a plurality of timers, each having a different reaction time value, are respectively associated with each of the queues. In a further feature, all the timers have the same reaction time value.

In another feature, the method further comprises receiving a download of a plurality of prefixes to the FIB, wherein each of the prefixes is respectively associated with one of a plurality of table version values, and establishing the priority associated with the queues based on the table version values.

In a further feature, the associated priority for the strict priority queues is established when the download is received.

In other aspects, the invention encompasses a computer apparatus and a computer-readable medium configured to carry out the foregoing steps.

2.0 Structural and Functional Overview

In certain embodiments, a method and apparatus providing prioritized FIB recursion resolution are provided. The approaches herein are useful in routers and other network elements that do not support a hierarchical FIB structure.

According to one method, a router or other network element establishes a forwarding information base (FIB) lacking a hierarchical data structure but wherein one or more dependent FIB entries are associated with a parent FIB entry. When the parent entry is modified, the dependent entries are queued along multiple strict priority queues. The classification of dependent entries into particular prioritized queues may be based on information specific to particular dependent entries, such as a priority community value, a type of change to the parent FIB entry (e.g., deletion of the parent FIB entry may be more important than modification), or local policy. The dependent FIB entries are enqueued in the selected queues for re-resolution. The dependent FIB entries are dequeued for re-resolution according to a priority order of the queues.

In one embodiment, each queue has an associated timer. In one particular embodiment, a conservative timer is used to delay the processing of the to-be-resolved entries, such as a one-second timer with explicit back-off behavior. In another embodiment, each queue has a different timer value, and the use of multiple priority queues allows for more aggressive timers for a subset of the entries that are important to resolve.

Using this approach, the overall FIB recursion resolution time may be reduced by introducing prioritization among the to-be-resolved entries and using different reaction timers for the various priority levels. For example, in prior approaches, the Loss of Connectivity (LoC) perceived by dependent entries when a parent entry is modified and a hierarchical/linking structure is not possible is on the order of [0, 1000 ms]+n*100 μs. As there is no prioritization, n is the total number of dependent entries. Some service providers are known to have remote PE routers with up to 100,000 FIB entries depending on one single parent entry. A worst-case additional LoC of 1 s+100 k*100 μs=11 seconds, which is clearly unacceptable. In contrast, with the use of prioritization and aggressive timers for the entries that are important to resolve, as provided herein, the time may approach (i*100 μs), where i is the number of important prefixes such that (i<<n).

The approaches herein are useful, for example, to network service providers that have deployed routers for delivering high-availability services.

3.0 Prioritized FIB Recursion Resolution

FIG. 1 is a block diagram that illustrates an overview of an example network context in which an embodiment may be implemented. A service provider network 102 associated with a first service provider is coupled through edge router 106 to a provider edge router PE1 of a second service provider network 104 that is associated with a second service provider. In the example of FIG. 1, the first service provider is unrelated to the second service provider; for example, networks 102, 104 are owned and operated by competitors.

Second service provider network 104 further includes core routers 108, 110 and a second provider edge router PE2. The second edge router PE2 has a plurality of interfaces denoted Int1, Int2, and also includes a forwarding information base (FIB) 112 that stores route information useful in packet forwarding.

Figure 2:
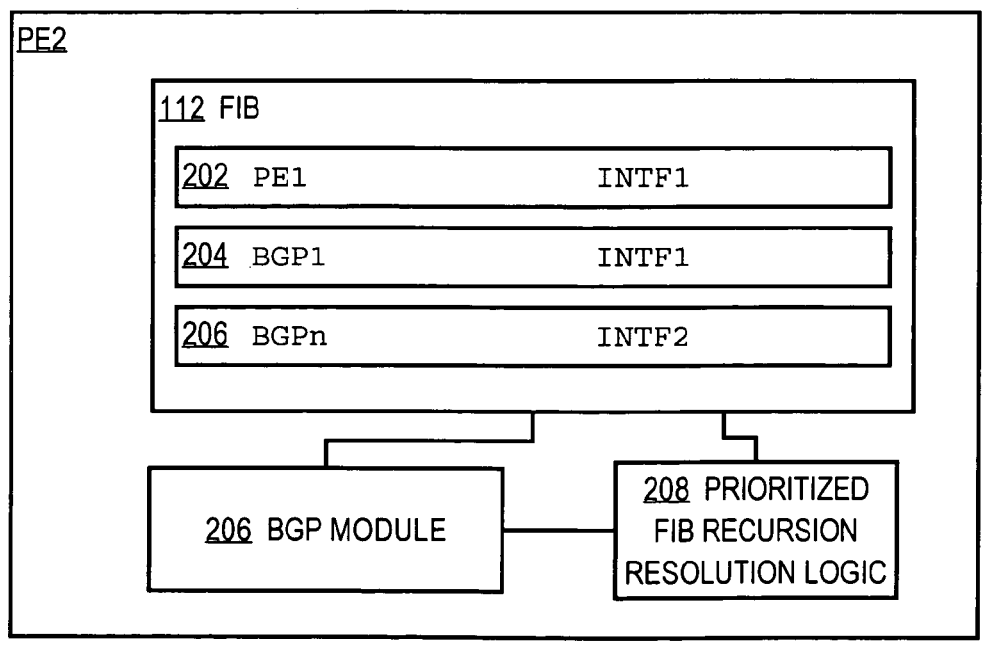
FIG. 2 is a block diagram that illustrates a high level overview of one embodiment of a provider edge router in which an embodiment may be implemented.

In an embodiment, edge routers PE1 and PE2 are internally configured with the elements shown in FIG. 2, among other elements. FIG. 2 is a block diagram that illustrates a high level overview of one embodiment of a provider edge router in which an embodiment may be implemented. FIB 112 comprises a plurality of FIB entries 202, 204, 206. In the example of FIG. 2, entry 202 is a parent entry and entries 204, 206 are dependent entries related to parent entry 202. PE2 further comprises a BGP software module 206 that hosts, is coupled to, or includes prioritized FIB recursion resolution logic 208, which comprises one or more programs, processes, or other software elements that implement the functional techniques described herein.

Figure 3:
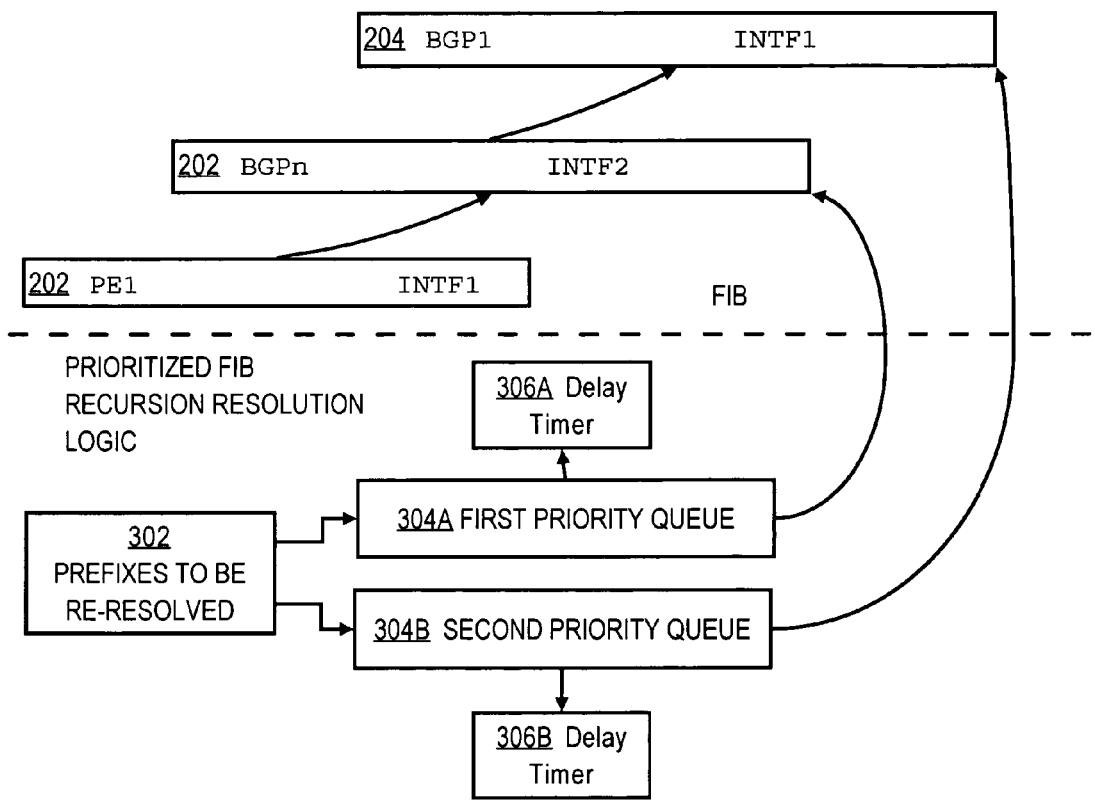
FIG. 3 is a block diagram that illustrates using priority queues for prioritized FIB recursion resolution.

FIG. 3 is a block diagram that illustrates using priority queues for prioritized FIB recursion resolution. According to an embodiment, upon execution, prioritized FIB recursion resolution logic 208 establishes one or more strict priority queues in memory of PE2. For example, a first priority queue 304A and second priority queue 304B are established. FIG. 3 shows two queues merely to illustrate a clear example, and in other embodiments, any number of queues may be used.

Each of the dependent FIB entries 202, 204 is assigned to a queue. Thus, a queue may be implemented as a linked list of pointers to dependent FIB entries. A queue may have any number of dependent FIB entries associated with the queue. Each queue also has an associated priority. For example, first queue 304A may be a higher-priority queue, and second queue 304B may be a lower-priority queue.

Figure 4A:
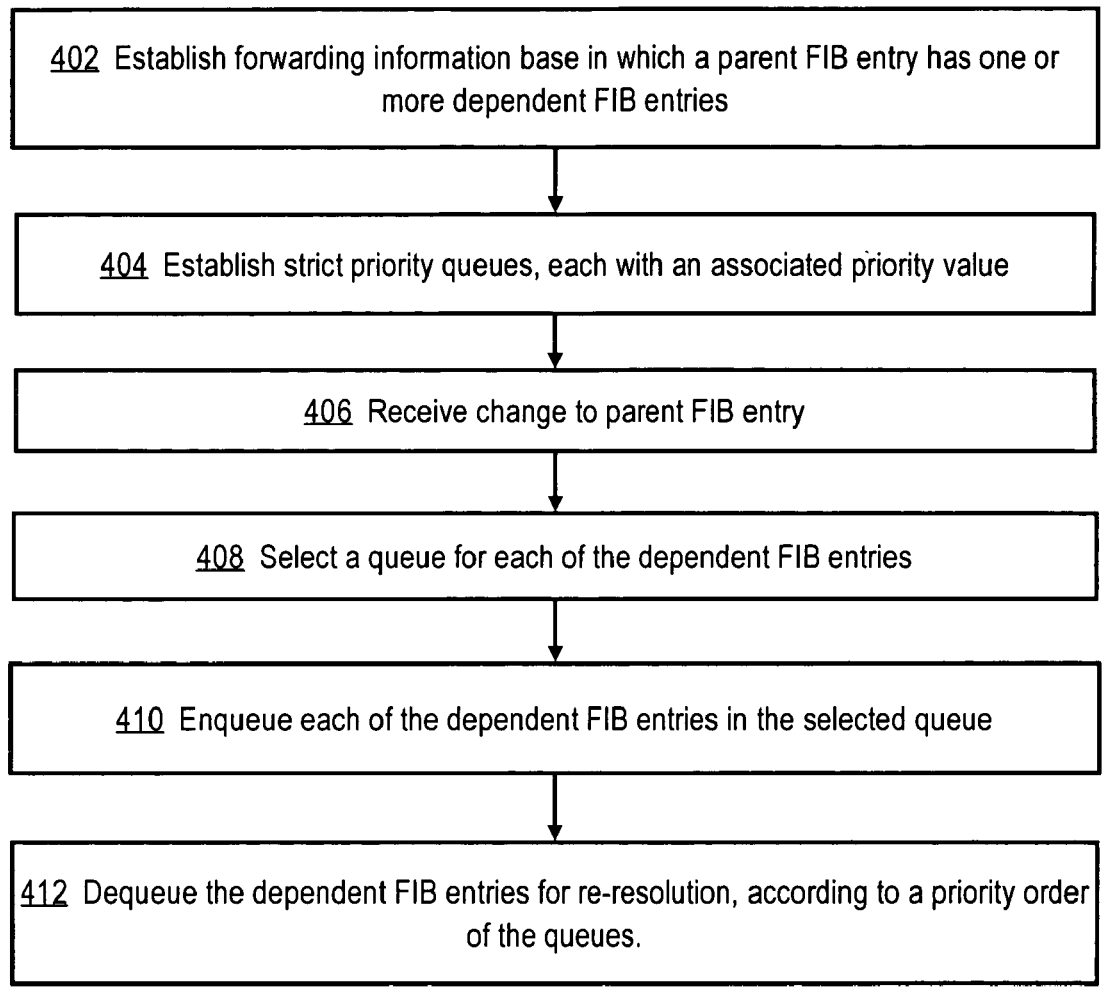
FIG. 4A is a block diagram illustrating a high-level view of a method of prioritized FIB recursion resolution.

FIG. 4A is a block diagram illustrating a high-level view of a method of prioritized FIB recursion resolution. In an embodiment, the method of FIG. 4A is performed in a network packet routing element, such as a router or switch. Typically, the method is performed in a provider edge router, but other embodiments may be performed in network elements located elsewhere in a network topology.

In step 402, a forwarding information base (FIB) is established. The FIB lacks a hierarchical data structure, but has one or more dependent FIB entries that are associated with a parent FIB entry.

In step 404, a plurality of strict priority queues is established. Each of the queues has an associated priority.

In step 406, a change to the parent FIB entry is received. For example, BGP module 206 may receive a BGP UPDATE message from a BGP peer with which PE2 has established a BGP peering session. The BGP UPDATE message may require a change in a RIB that holds a particular prefix. After performing route update computations, the BGP module downloads modified route information to the FIB. The modified route information may require a change in a parent FIB entry.

At step 408, for each of the dependent FIB entries, one of the queues is selected, and the dependent FIB entries are enqueued in the selected queues for re-resolution. Selection of a queue or priority may proceed as described above in connection with FIG. 4B. At step 410, the dependent FIB entries are dequeued for re-resolution, according to a priority order of the queues.

Figure 4B:
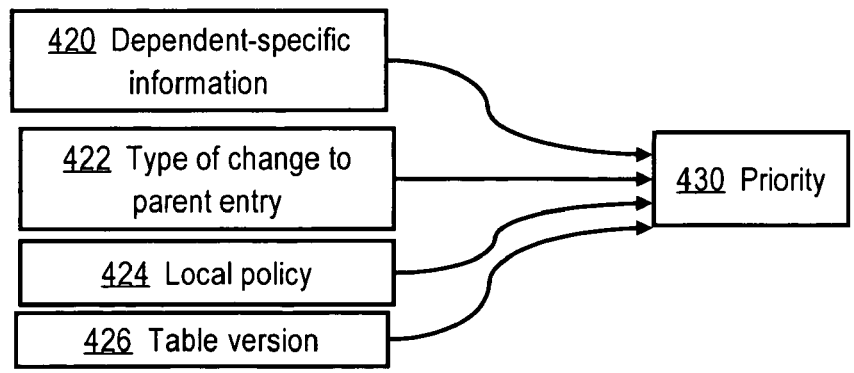
FIG. 4B is a block diagram illustrating sources of priority information.

Dependent FIB entries may be assigned to a priority queue based on a variety of approaches. FIG. 4B is a block diagram illustrating sources of priority information. A priority 430 of a particular queue may be derived from information 420 that is specific to a dependent FIB entry, a type of change 422 to a parent entry, local policy 424, or a FIB or RIB table version 426. An example of information 420 is a priority community associated with or forming a part of a dependent FIB entry.

An example of using a type of change 422 to determine priority 430 is that a modification of a parent FIB entry could be considered more important than a deletion of the parent FIB entry, so that in the case of a modification, the dependent entries would be queued to a higher-priority queue. An example of using local policy 424 to determine priority 430 is that the local policy may specify that all FIB entries relating to a particular service (e.g., IPv4, IPv6, VPNv4, VPNv6, etc.)

In an embodiment, a table version 426 may affect a priority determination. For example, BGP module 206 may download a plurality of prefixes from a routing information base (RIB) to the FIB. Each of the prefixes may be respectively associated with one of a plurality of table version values indicating a version number of a RIB table representing a source of the prefixes. The prioritized FIB recursion resolution logic 208 then may establish the priority 430 associated with the queues based on the table version values.

Referring again to FIG. 3, in one embodiment, each of the priority queues 304A, 304B is associated with a respective delay timer 306A, 306B. The delay timer imposes a variable length period of delay from consideration of the queue and performing recursion re-resolution of entries in the queue. When a timer for a particular queue expires, then all the entries in that queue are successively subjected to recursive re-resolution. The use of timers further refines the priority associated with a queue. In particular, with this approach, more-aggressive timers can be used for a subset of the entries that are important to resolve, and less-aggressive timers can be used for entries that are less important.

The use of timers enables an embodiment to manage CPU utilization in a router effectively. For example, a small set of entries may be important to resolve, but may require a large amount of CPU time for resolution, and during resolution the CPU of the router may be effectively unavailable for other tasks. In contrast, a larger set of entries may be less important and need less CPU time. With the present approach, CPU-intensive entries may be grouped together in a queue with an aggressive timer that expires first, before the timer of the queue with the less-important entries. Therefore, CPU-intensive operations are performed first in a short amount of time, and the CPU becomes available more quickly for other critical router operations. Further, the less-intensive resolutions are delayed until later, when they can be performed by the CPU at a time that the CPU is also handling other tasks. This approach has been shown in theory to result in reduced total recursive re-resolution time.

Alternatively, no timers are used, but the queues are ordered as to priority. In this embodiment, each queue is considered in order. For example, first priority queue 304A is considered first, and all its entries are subjected to recursive re-resolution; when all entries are resolved, then second priority queue 304B is considered, and all its entries are resolved.

4.0 Implementation Mechanisms—Hardware Overview

Figure 5:
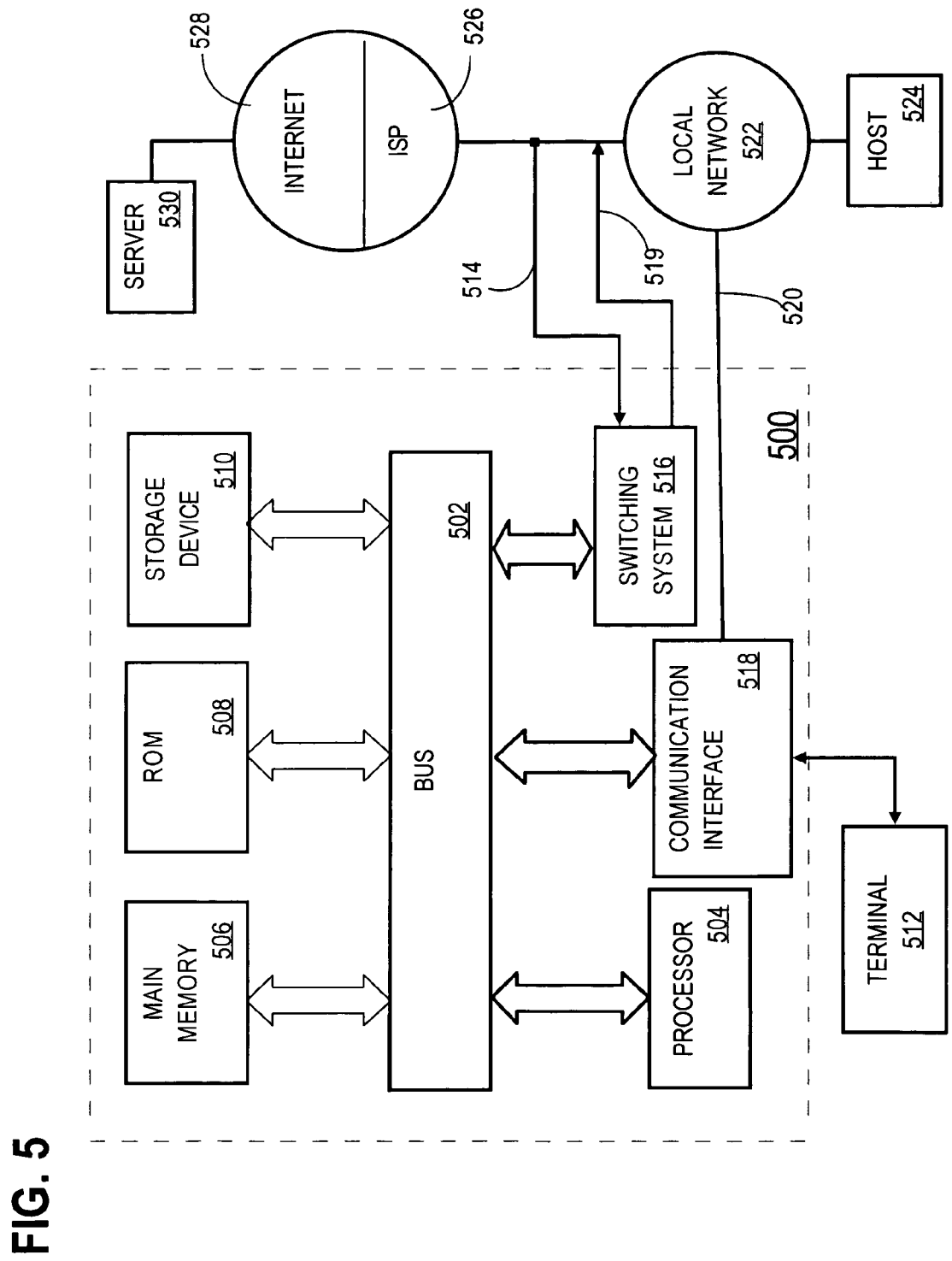
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory, or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for BGP service auto discovery. According to one embodiment of the invention, BGP service auto discovery is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520, and communication interface 518. In the Internet example, a server 530 might transmit a requested code for an application program through Internet 528, ISP 526, local network 522 and communication interface 518. In accordance with the invention, one such downloaded application provides for BGP service auto discovery as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, performed in a network packet routing element, the method comprising:
    establishing a forwarding information base (FIB) lacking a hierarchical data structure but wherein one or more dependent FIB entries are associated with a parent FIB entry;
    establishing a plurality of strict priority queues, wherein each of the queues has an associated priority;
    receiving a change to the parent FIB entry;
    for each of the dependent FIB entries, selecting one of the queues and enqueuing the dependent FIB entries in the selected queues for re-resolution;
    dequeuing the dependent FIB entries for re-resolution, according to a priority order of the queues.

2. A method as recited in claim 1, wherein one of the queues for a particular dependent FIB entry is selected based on a priority community value or other information specific to the particular dependent FIB entry.

3. A method as recited in claim 1, wherein one of the queues for a particular dependent FIB entry is selected based on a type of the change to the parent FIB entry.

4. A method as recited in claim 1, wherein one of the queues for a particular dependent FIB entry is selected based on a local policy stored in the network element that specifies one of the queues for all FIB entries associated with a particular service.

5. A method as recited in claim 3, wherein a higher-priority queue is selected when the change to the parent FIB entry is a deletion and a lower-priority queue is selected when the change is a modification.

6. A method as recited in claim 1, wherein a plurality of timers, each having a different reaction time value, are respectively associated with each of the queues.

7. A method as recited in claim 5, wherein all the timers have the same reaction time value.

8. A method as recited in claim 1, further comprising:
    receiving a download of a plurality of prefixes to the FIB, wherein each of the prefixes is respectively associated with one of a plurality of table version values;
    establishing the priority associated with the queues based on the table version values.

9. A method as recited in claim 8, wherein the associated priority for the strict priority queues is assigned when the download is received.

10. A packet data router, performed in a network packet routing element, the packet data router comprising:
    one or more line cards comprising one or more interfaces that can connect to a packet-switched network;
    a forwarding information base (FIB) coupled to one or more of the line cards and lacking a hierarchical data structure but wherein one or more dependent FIB entries are associated with a parent FIB entry;
    one or more processors;
    prioritized FIB recursion resolution logic coupled to the one or more processors, wherein the prioritized FIB recursion resolution logic causes the one or more processors to perform:
    establishing a plurality of strict priority queues, wherein each of the queues has an associated priority;
    receiving a change to the parent FIB entry;
    for each of the dependent FIB entries, selecting one of the queues and enqueuing the dependent FIB entries in the selected queues for re-resolution;
    dequeuing the dependent FIB entries for re-resolution, according to a priority order of the queues.

11. A packet data router as recited in claim 10, wherein one of the queues for a particular dependent FIB entry is selected based on a priority community value or other information specific to the particular dependent FIB entry.

12. A packet data router as recited in claim 10, wherein one of the queues for a particular dependent FIB entry is selected based on a type of the change to the parent FIB entry.

13. A packet data router as recited in claim 10, wherein one of the queues for a particular dependent FIB entry is selected based on a local policy stored in the network element that specifies one of the queues for all FIB entries associated with a particular service.

14. A packet data router as recited in claim 13, wherein a higher-priority queue is selected when the change to the parent FIB entry is a deletion and a lower-priority queue is selected when the change is a modification.

15. A packet data router as recited in claim 10, wherein a plurality of timers, each having a different reaction time value, are respectively associated with each of the queues.

16. A packet data router as recited in claim 15, wherein all the timers have the same reaction time value.

17. A packet data router as recited in claim 10, further comprising:
    receiving a download of a plurality of prefixes to the FIB, wherein each of the prefixes is respectively associated with one of a plurality of table version values;
    establishing the priority associated with the queues based on the table version values.

18. A packet data router as recited in claim 17, wherein the associated priority for the strict priority queues is assigned when the download is received.

19. An apparatus, performed in a network packet routing element, the method comprising:
    means for establishing a forwarding information base (FIB) lacking a hierarchical data structure but wherein one or more dependent FIB entries are associated with a parent FIB entry;
    means for establishing a plurality of strict priority queues, wherein each of the queues has an associated priority;
    means for receiving a change to the parent FIB entry;
    means for selecting one of the queues for each of the dependent FIB entries and for enqueuing the dependent FIB entries in the selected queues for re-resolution;
    means for dequeuing the dependent FIB entries for re-resolution, according to a priority order of the queues.

20. An apparatus as recited in claim 19, wherein one of the queues for a particular dependent FIB entry is selected based on a priority community value or other information specific to the particular dependent FIB entry.

21. An apparatus as recited in claim 19, wherein one of the queues for a particular dependent FIB entry is selected based on a type of the change to the parent FIB entry.

22. An apparatus as recited in claim 19, wherein one of the queues for a particular dependent FIB entry is selected based on a local policy stored in the network element that specifies one of the queues for all FIB entries associated with a particular service.

23. An apparatus as recited in claim 22, wherein a higher-priority queue is selected when the change to the parent FIB entry is a deletion and a lower-priority queue is selected when the change is a modification.

24. An apparatus as recited in claim 19, wherein a plurality of timers, each having a different reaction time value, are respectively associated with each of the queues.

25. An apparatus as recited in claim 23, wherein all the timers have the same reaction time value.

26. An apparatus as recited in claim 19, further comprising:
means for receiving a download of a plurality of prefixes to the FIB, wherein each of the prefixes is respectively associated with one of a plurality of table version values;
means for establishing the priority associated with the queues based on the table version values.

27. An apparatus as recited in claim 26, wherein the associated priority for the strict priority queues is assigned when the download is received.

* * * * *